United States Patent
Liu et al.

(10) Patent No.: US 11,820,896 B2
(45) Date of Patent: Nov. 21, 2023

(54) UV/MOISTURE DUAL CURE COMPOSITION WITH ENHANCED SUBSTRATE ADHESION

(71) Applicants: Dow Silicones Corporation, Midland, MI (US); Dow Global Technologies LLC, Midland, MI (US)

(72) Inventors: Junying Liu, Midland, MI (US); Gang Lu, Freeport, TX (US)

(73) Assignees: DOW GLOBAL TECHNOLOGIES LLC, Midland, MI (US); DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 17/928,305

(22) PCT Filed: Aug. 30, 2021

(86) PCT No.: PCT/US2021/048169
§ 371 (c)(1),
(2) Date: Nov. 29, 2022

(87) PCT Pub. No.: WO2022/051207
PCT Pub. Date: Mar. 10, 2022

(65) Prior Publication Data
US 2023/0193029 A1 Jun. 22, 2023

Related U.S. Application Data

(60) Provisional application No. 63/072,977, filed on Sep. 1, 2020.

(51) Int. Cl.
| | | |
|---|---|---|
| C09D 183/08 | (2006.01) |
| C08F 2/48 | (2006.01) |
| C08L 83/08 | (2006.01) |
| C08F 2/50 | (2006.01) |
| C08K 5/5415 | (2006.01) |

(52) U.S. Cl.
CPC ............ C08L 83/08 (2013.01); C08F 2/48 (2013.01); C08F 2/50 (2013.01); C08K 5/5415 (2013.01); C09D 183/08 (2013.01); C08L 2205/02 (2013.01)

(58) Field of Classification Search
CPC combination set(s) only.
See application file for complete search history.

(56) References Cited

U.S. PATENT DOCUMENTS

| | | | | |
|---|---|---|---|---|
| 4,889,905 | A * | 12/1989 | Suzuki | C08L 83/04 528/33 |
| 5,158,988 | A | 10/1992 | Kurita et al. | |
| 5,684,113 | A | 11/1997 | Nakanishi et al. | |
| 5,753,720 | A | 5/1998 | Nakanishi et al. | |
| 7,105,584 | B2 | 9/2006 | Chambers et al. | |
| 2020/0207985 | A1* | 7/2020 | Lim | C08L 83/04 |
| 2020/0283630 | A1* | 9/2020 | Liu | C08L 83/04 |
| 2021/0139703 | A1* | 5/2021 | Lim | C08L 83/04 |
| 2021/0388208 | A1* | 12/2021 | Liu | C08L 83/08 |
| 2022/0145020 | A1* | 5/2022 | Liu | C08L 83/04 |

FOREIGN PATENT DOCUMENTS

| | | |
|---|---|---|
| CN | 103992650 | 8/2014 |
| WO | 2019005393 | 1/2019 |
| WO | 2020076620 | 4/2020 |

* cited by examiner

*Primary Examiner* — Marc S Zimmer
(74) *Attorney, Agent, or Firm* — Steven W. Mork

(57) ABSTRACT

A composition contains: (a) a first organopolysiloxane with an average of 2 or more mercaptoalkyl groups per molecule and that is free of alkenyl functionality; (b) a second organopolysiloxane with an average of one or more alkenyl group and one or more alkoxy group per molecule; (c) a tetraalkoxy silane; (d) an ultraviolet light photoinitiator; and (E) a condensation catalyst; where the concentration of the first and second organopolysiloxanes are such that the molar ratio of mercaptoalkyl groups to alkenyl groups is in a range of 0.4 to 3.0.

10 Claims, No Drawings

UV/MOISTURE DUAL CURE COMPOSITION WITH ENHANCED SUBSTRATE ADHESION

FIELD OF THE INVENTION

The present invention relates to an organopolysiloxane composition that undergoes curing by both ultraviolet light induced radical curing and moisture triggered curing.

INTRODUCTION

Dual cure compositions that cure by both ultraviolet (UV) light and moisture are useful, for example, in coating, encapsulation, potting and adhesive applications where exposure of all portions of a coating to light is difficult yet rapid curing of the coating is desirable. The UV light curing aspect of the composition provides for a rapid initial curing of the composition to facilitate continued process or handling without damage to the coating. The moisture cure mechanism serves to cure composition blocked from exposure to light ("shadow areas") as well as cure the composition more completely over time.

A challenge with dual cure compositions can be achieving strong adhesion to a substrate. Even more challenging, yet desirable, is a dual cure composition that can achieve strong adhesion to a variety of substrates, such as FR4 board (glass-reinforced epoxy laminate material) and metal such as aluminum. A UV/moisture dual cure composition that can achieve strong adhesion to a variety of substrates would provide a versatile coating composition useful in numerous different applications.

BRIEF SUMMARY OF THE INVENTION

The present invention provides a solution to a UV/moisture dual cure composition that achieves strong adhesion to a variety of substrates including FR4 Board and metal. "Strong adhesion" refers to achieving an adhesion rating of 4 or 5 in the Tape Adhesion test defined hereinbelow.

The invention is a result of discovering that tetraalkoxy silanes demonstrate enhanced adhesion promoting properties to UV/moisture dual cure compositions relative to similar dual cure compositions without the tetraalkoxy silane and composition containing alternative adhesion promoters. Moreover, it has been discovered that tetraalkoxy silanes serve as better adhesion promoters in UV/moisture dual cure compositions than in just UV cure systems and better adhesion promoters in UV/moisture cure formulations than other adhesion promoters taught to be effective adhesion promoters in light initiated cure systems.

Even more surprising, it has been discovered that dual cure composition comprising tetraalkoxy silane adhesion promoters have greater shelf stability than dual cure compositions with other adhesion promoters.

In a first aspect, the present invention is a composition comprising: (a) a first organopolysiloxane comprising an average of 2 or more mercaptoalkyl groups per molecule and that is free of alkenyl functionality; (b) a second organopolysiloxane comprising an average of one or more alkenyl group and one or more alkoxy group per molecule; (c) a tetraalkoxy silane; (d) an ultraviolet light photoinitiator; and (E) a condensation catalyst; where the concentration of the first and second organopolysiloxanes are such that the molar ratio of mercaptoalkyl groups to alkenyl groups is in a range of 0.4 to 3.0.

In a second aspect, the present invention is a method of using the composition of the first aspect, the method comprising applying the composition to a substrate and optionally exposing the composition to UV light and/or moisture.

In a third aspect, the present invention is an article comprising the composition of the first aspect on a substrate.

The composition of the present invention is useful as a coating or an encapsulant on a substrate.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; ISO refers to International Organization for Standards; and UL refers to Underwriters Laboratory.

Products identified by their tradename refer to the compositions available under those tradenames on the priority date of this document.

"Multiple" means two or more. "And/or" means "and, or as an alternative". All ranges include endpoints unless otherwise indicated. Unless otherwise stated, all weight-percent (wt %) values are relative to composition weight and all volume-percent (vol %) values are relative to composition volume.

"Alkyl group" refers to an alkane having one hydrogen replaced with a bond to the atom to which the alkyl group is attached.

"Trialkoxysilyl" group refers to $-Si(OR)_3$, where R is an alkyl group attached to the oxygen.

The composition of the present invention comprises a first organopolysiloxane that comprises mercaptoalkyl groups and that is free of alkenyl functionality. The first organopolysiloxane comprises an average of 2 or more, and can comprise 3 or more, 4 or more, even 5 or more mercaptoalkyl groups per molecule. A mercapto alkyl group has the following structure: HSR'—, where R' is a divalent hydrocarbon group with one or more, and can have 2 or more, 3 or more, even 4 or more carbon atoms while at the same time typically has 6 or fewer, 5 or fewer, 4 or fewer, even 3 or fewer carbon atoms. For example, the mercapto alkyl group can be selected from a group consisting of $HSCH_2-$, $HSCH_2CH_2-$, $HS(CH_2)_2CH_2-$, and $HS(CH_2)_3CH_2-$.

The first organopolysiloxane can have the following chemical structure:

$$(R_2R''SiO_{1/2})_2(RR'SiO_{2/2})_m(R_2SiO_{2/2})_n$$

where each R is independently in each occurrence selected from alkyl and aryl groups, preferably from a group consisting of methyl, ethyl, phenyl, and 3,3,3,-trifluoropropyl groups; each R' is independently in each occurrence selected from a group consisting of mercaptoalkyl groups as described in the previous paragraph; R'' is independently in each occurrence selected from the options for R and R'; subscript m is the average number of $(RR'SiO_{2/2})$ groups per molecule and is 2 or more, and can be 3 or more, 4 or more 5 or more, 10 or more 25 or more, 50 or more, even 75 or more and at the same time is typically 100 or less, 75 or less, 50 or less, 25 or less, 10 or less, or even 5 or less; and m is the average number of $(R_2SiO_{2/2})$ groups per molecule and is zero or more, and can be 5 or more, 10 or more, 20 or more, 30 or more, 40 or more, 50 or more, 60 or more 70 or more 80 or more, 90 or more 100 or more, 200 or more, 300 or more, 400 or more, or even 500 or more while at the same time is typically 1000 or less, 750 or less, 500 or less, 250 or less, 100 or less, 75 or less, even 50 or less. In one particularly desirable first organopolysiloxane has R and R″ are both methyl, R′ is $HS(CH_2)_2CH_2-$, and on average n is 43 and m is 5. First organopolysiloxanes can be made according to processes taught in U.S. Pat. No. 4,780,486A.

The composition of the present invention also comprises a second organopolysiloxane that contains at least one alkenyl group and at least one alkoxy group. The second organopolysiloxane desirably contains, on average, 2 or more, and can contain 3 or more, 4 or more, even 5 or more and at the same time typically 10 or fewer, 8 or fewer, 6 or fewer, 4 or fewer, 3 or fewer, even 2 or fewer alkenyl groups per molecule. The alkenyl group desirably is a terminal alkenyl group having two or more and can have 3 or more, 4 or more, even 5 or more carbon atoms while at the same time desirably has 12 or fewer, even 10 or fewer, 8 or fewer, 6 or fewer and can have 4 or fewer, even 3 or fewer carbon atoms on average. The alkenyl group can be a vinyl group.

At the same time, the second organopolysiloxane can have, on average, 2 or more, 3 or more, 4 or more, 5 or more even 6 or more while at the same time typically has 15 or fewer, 12 or fewer, 10 of fewer, 8 or fewer, even 6 or fewer alkoxy groups per molecule. Alkoxy groups have the structure $-OR^\gamma$ where $R^\gamma$ is a monovalent hydrocarbon having one or more, 2 or more, 3 or more, 4 or more, 5 or more, even 6 or more and at the same time typically has 10 or fewer, 8 or fewer, 6 or fewer, 5 or fewer, 4 or fewer, 3 or fewer, even 2 or fewer carbon atoms. The alkoxy groups can be selected from a group consisting of methoxy, ethoxy, and propoxy groups.

The alkoxy groups are typically part of one or more than one alkoxy-containing groups such as one or more than one silyl group, one or more than one trialkoxysilane group, or a combination of alkoxy silyl and trialkoxy silane groups. Preferably, the second organopolysiloxane contains alkoxy groups as part of one or more, 2 or more, 3 or more, even 4 or more while at the same time typically 5 or fewer, 4 or fewer, 3 or fewer, even 2 or fewer trialkoxysilyl groups.

The silyl group and/or trialkoxy silane group can be part of another group bound to a siloxane group of the second organopolysiloxane. For example, a trialkoxy silane group can be part of an alkyltrialkoxy silane group that is attached to a silicon atom of a siloxane unit. One particularly desirable trialkoxy silane group has the chemical structure of Structure (I):

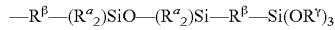

where: $R^\beta$ is independently in each occurrence selected from divalent hydrocarbon groups having one or more, 2 or more, 3 or more, even 4 or more carbon atoms while at the same time typically having 6 or fewer, 5 or fewer, 4 or fewer, 3 or fewer, even 2 or fewer carbon atoms; $R^\alpha$ is independently in each occurrence selected form alkyl and aryl groups, preferably having from one to 8 carbon atoms, and is most preferably selected from methyl, ethyl, phenyl and benzyl groups; and $R^\gamma$ is as described above. For one particularly desirable trialkoxy silane group of Structure (I), $R^\beta$ is $-^{CH}{}_2CH_2-$, and both $R^\alpha$ and $R^\gamma$ are each methyl.

The second organopolysiloxane can have the following general chemical structure:

where:
$R^\alpha$ is independently in each occurrence selected form alkyl and aryl groups, preferably having from one to 8 carbon atoms, and is most preferably selected from methyl, ethyl, phenyl and benzyl groups;

B is independently in each occurrence selected from alkenyl and alkoxy and alkoxy-containing groups as described above for the second organopolysiloxane so as to achieve the previously specified number of alkenyl and alkoxy groups per molecule;

x is, on average, a value of zero or more and can be one or more, 2 or more, even 3 or more while at the same time is generally 10 or less and can be 8 or less, 6 or less, 4 or less, even 3 or less, 2 or less.

The sum of y and y', on average, is a value of 20 or more, preferably 40 or more, 60 or more, 80 or more, 100 or more, even 120 or more while at the same time is typically 1000 or less, 800 or less, 600 or less, 400 or less, 200 or less, even 150 or less, 140 or less, 130 or less or 120 or less. Individually, either y or y' can be zero or any value less than 20 provided the sum of y and y' falls in the specified values.

Subscript z desirably has an average value of 2 or more, and can be 3 or more, 4 or more, 5 or more, 6 or more, 8 or more, even 10 or more and at the same time is typically 20 or less, 15 or less, 10 or less, 8 or less, 6 or less, even 4 or less or 2 or less.

The second organopolysiloxane can have the following chemical structure:

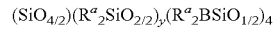

where: y has an average value of 20 or more, and can be 30 or more, 40 or more, 50 or more, 75 or more 100 or more, 200 or more, 300 or more, 400 or more, even 500 or more while at the same time is generally 1000 or less, 900 or less, 800 or less, 700 or less, 600 or less, 500 or less and can be 400 or less, 300 or less, 200 or less, 100 or less, 50 or less, 40 or less, even 30 or less; $R^\alpha$ is as previously described; one or more than one B is a vinyl group and one or more than one B is $-CH_2CH_2-Si(CH_3)_2-O-Si(CH_3)_2-Si(OCH_3)_3$.

One desirable second organopolysiloxane has the following average chemical structure:

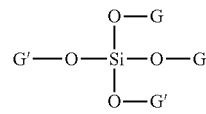

where:
G' has the following structure:

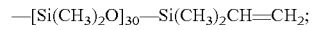

and
G' has the following structure:

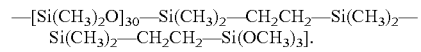

The concentration of first and second organopolysiloxanes is such that the molar ratio of mercaptoalkyl groups to alkenyl groups is 0.4 or more, and can be 0.5 or more, 0.8 or more, 1.0 or more, 1.5 or more, even 2.0 or more while at the same time is typically 3.0 or less, and can be 2.5 or less, 2.0 or less, 1.5 or less, even 1.0 or less.

The composition of the present invention comprises a tetraalkoxy silane. The tetraalkoxy silane serves as an adhesion promoter for the composition. However, unlike other adhesion promoters, tetraalkoxy silane surprisingly enhances adhesion for UV/moisture dual cure compositions and to a greater extent than other adhesion promoters known for use in light curable compositions. Moreover, formulations using tetraalkoxy silane as an adhesion promoter surprisingly have longer shelf life than formulations using other types of adhesion promoters, where shelf life is determined by how quickly a formulation builds viscosity and eventually gels or solidifies when stored at 55 degrees Celsius.

The tetraalkoxy silane desirably has the following chemical structure: $Si(OR^\gamma)_4$, where $R^\gamma$ is independently in each occurrence a monovalent hydrocarbon having one or more, 2 or more, 3 or more, 4 or more, 5 or more, even 6 or more and at the same time typically has 10 or fewer, 8 or fewer, 6 or fewer, 5 or fewer, 4 or fewer, 3 or fewer, even 2 or fewer carbon atoms. Desirably, the tetraalkoxy silane is selected from a group consisting of tetramethoxy silane (TMOS), tetraethoxy silane (TEOS), tetra(n-propoxy) silane (TPOS) and tetra(n-butoxy) silane and tetra (t-butoxy) silane.

The tetraalkoxy silane is typically present at a concentration of 0.1 weight-percent (wt % or more, and can be 0.5 wt % or more, 1.0 wt % or more, 1.5 wt % or more, 2.0 wt % or more, 2.5 wt % or more, 3.0 wt % or more, 3.5 wt % or more even 4.0 wt % or more while at the same time is typically present at a concentration of 5.0 wt % or less, and can be 4.5 wt % or less, 4.0 wt % or less, 3.5 wt % or less, 3.0 wt % or less, 2.5 wt % or less, 2.0 wt % or less or even 1.0 wt % or less where wt % is tetraalkoxy silane is relative to composition weight.

The composition of the present invention comprises an ultraviolet (UV) light photoinitiator. The UV light photoinitiator forms radicals upon exposure to UV light.

Examples of suitable UV light photoinitators include any one or any combination of more than one of the following: 2-hydroxy-2-methylpropiophenone, diethoxyacetophenone, benzoin methyl ether, benzoin ethyl ether, benzoin isopropyl ether, diethoxyxanthone, chloro-thioxanthone, azobisisobutyronitril, N-methyl diethanolaminebenzophenone 4,4'-bis(dimethylamino)benzophenone, diethoxyacetophenone, 2,2-dimethoxy-1,2-diphenylethan-1-one,1-hydroxycyclohexyl-phenylketone, 2-hydroxy-2-methyl-1-phenylpropan-1-one, 2-methyl-1-[4-(methylthio)phenyl]-2-morpholinopropan-1-one, 1-[4-(2-hydroxyethoxy)phenyl]2-morpholinopropan-1-one, 2-benzyl-2-dimethylamino-1-(4-morpholinophenyl)butan-1-one, and bis(2,4,6-trimethylbenzoyl)phenylphosphine oxide. The UV light photoinitiator is typically present at a concentration of 0.01 wt % or more, and can be 0.05 wt % or more, 0.1 wt % or more, 0.5 wt % or more, 1.0 wt % or more, 1.5 wt % or more 2.0 wt % or more, 2.5 wt % or more, 3.0 wt % or more, even 3.5 wt % or more and at the same time is typically present at a concentration of 5.0 wt % or less, 4.5 wt % or less, 4.0 wt % or less, 3.5 wt % or less, 3.0 wt % or less, 2.5 wt % or less, 2.0 wt % or less, 1.5 wt % or less, or even 1.0 wt % or less where wt % UV light photoinitiator is relative to composition weight.

The composition of the present invention comprises a condensation catalyst. The condensation catalyst can be selected from one or any combination of more than one catalyst selected from: titanium (IV) isopropoxide, titanium (IV) n-butoxide, titanium (IV) t-butoxide, titanium (IV), titanium di(isopropoxy)bis(ethylacetoacetate), titanium di(isopropoxy)bis(methylacetoacetate), titanium di(isopropoxy)bis(acetylacetonate), zirconium (IV) isopropoxide, zirconium (IV) n-butoxide, zirconium (IV) t-butoxide, zirconium di(isopropoxy)bis(ethylacetoacetate), zirconium di(isopropoxy)bis(methylacetoacetate), zirconium di(isopropoxy)bis(acetylacetonate, dimethyltin dineodecanoate, dibutyltin dilaurate, dibutyltin dioctoates, and stannous octoate.

The condensation catalyst is typically present at a concentration of 0.01 wt % or more, and can be 0.1 wt % or more, 0.5 wt % or more, 1.0 wt % or more, 2.0 wt % or more, 2.5 wt % or more, 3.0 wt % or more, 3.5 wt % or more, 4.0 wt % or more, 5.0 wt % or more, even 6.0 wt % or more while at the same time is typically 10.0 wt % or less, or even 9.0 wt % or less, 8.0 wt % or less, 7.0 wt % or less, 6.0 wt % or less, 5.0 wt % or less, 4.0 wt % or less, 3.0 wt % or less, 2.0 wt % or less, even 1.0 wt % or less, with wt % relative to composition weight.

The composition of the present invention can comprise, or be free of, additional components beyond those already mentioned. For example the composition of the present invention can comprise, or be free of, any one or any combination of additional components selected from: (i) alkenyl-functional alkoxy-free organopolysiloxanes; (ii) alkyl trialkoxy silanes; (iii) radical scavengers; and (iv) fillers.

Alkenyl-functional alkoxy-free organopolysiloxanes can be desirable in the composition to speed UV light triggered radical curing reactions with the mercapto groups of the first organopolysiloxane and to adjust final mechanical properties of the cured composition. For instance, including long-chain alkenyl-functional alkoxy-free organopolysiloxanes such as a long chain polydimethylsiloxane terminally capped with alkenyl (such as vinyl) can increase the elongation at break for the final cured composition.

Examples of alkenyl-functional alkoxy-free organopolysiloxanes include polydimethylsiloxane capped on one or both ends with alkenyl such as vinyl. Alkenyl-functional alkoxy-free organopolysiloxanes can be present at a concentration of zero wt % or more, 5 wt % or more 10 wt % or more, even 15 wt % or more while at the same time is typically present at a concentration of 50 wt % or less, 40 wt % or less, 30 wt % or less, 20 wt % or less, even 10 wt % or less with wt % relative to composition weight.

Alkyl trialkoxy silanes can be desirable in the composition as crosslinkers. Crosslinkers can strengthen, toughen and/or make more rigid the composition after curing. Examples of suitable alkyl trialkoxy silanes include those having alkyl group with one to 6 carbon atoms and alkoxy groups with one to 6 carbon atoms. Suitable alkyl trialkoxy silanes include methyl trimethoxy silane, ethyl trimethoxy silane, propyl trimethoxy silane, butyl trimethoxy silane, methyl triethoxy silane, methyl tripropoxy silane, ethyl triethoxy silane and ethyl tripropoxy silane. Alkyl trialkoxy silanes can be present at a concentration of zero wt % or more, 0.1 wt % or more, 0.5 wt % or more, 1.0 wt % or more, 2.0 wt % or more, even 5.0 wt % or more while at the same time are typically present at a concentration of 10 wt % or less, 8 wt % or less, 5 wt % or less, 4 wt % or less, 3 wt % or less, 2 wt % or less or even 1.0 wt % or less with wt % relative to composition weight.

Radical scavengers can be desirable to enhance shelf life of a composition. Examples of suitable radical scavengers include any one or combination of more than one of butylated hydroxytoluene (BHT), 4-methoxyphenol, tert-butyl-hydroquinone, 6-tert-butyl-2,4-xylenol, 2-tert-butyl-1,4-benzoquinone, 4-tert-butylpyrocatechol, and 2,6-di-tert-butylphenol. Radical scavengers can be present at a concentration of zero wt % or more, 0.1 wt % or more, 0.5 wt % or more, 1.0 wt % or more, even 2.0 wt % or more while at the same time are typically present at a concentration of 3.0 wt % or less, 2.0 wt % or less, or even 1.0 wt % or less with wt % relative to composition weight.

Fillers can be desirable in the composition to modify rheological properties of the composition and/or modify mechanical properties of the composition after curing. Examples of suitable fillers include silica such as fumed silica, and quartz. Filler may be present at a concentration of zero wt % or more, one wt % or more, 5 wt % or more, 10 wt % or more, 15 wt % or more, even 20 wt % or more while at the same time are typically present at a concentration of 30 wt % or less, 20 wt % or less, 10 wt % or less or even 5 wt % or less with wt % relative to composition weight.

Composition of the present invention are particularly useful for applying to a substrate and curing to form an article with a cured form of the composition attached thereto. Compositions of the present invention achieve strong adhesion to a variety of substrates including FR4 Board and metal. "Strong adhesion" refers to achieving an adhesion rating of 4 or 5 in the Tape Adhesion test defined hereinbelow.

The method of the present invention comprises applying the composition of the present invention to a substrate, such as a metal or FR4 Board. The method optionally includes exposing the composition to UV light, preferably after applying to the composition to the substrate. The UV light initiates curing of the composition and can facilitate curing of the composition onto the substrate.

The article of the present invention comprises a substrate, such as FR4 Board and metal, with the composition of the present invention in contact with the substrate. The article is a result of the method of the present invention. The article can comprise the composition in an uncured state or in a cured state.

EXAMPLES

Table 1 lists the materials for use in the following examples. "Vi" refers to a vinyl group. XIAMETER is a trademark of Dow Corning Corporation.

TABLE 1

| Component | Description | Source |
|---|---|---|
| First Organopolysiloxane | Dimethylsiloxane methyl(3-mercaptopropyl)siloxane copolymer having the following chemical structure: $(R_2R''SiO_{1/2})_2(RR'SiO_{2/2})_m(R_2SiO_{2/2})_n$ where R=R" = methyl, R'=HS(CH$_2$)$_2$CH$_2$—, and on average n = 43 and m = 5. | Prepare according to procedures taught in U.S. Pat. No. 4,780,486A |
| Tetraalkoxy Silane I (TEOS) | Tetraethoxysilane | Commercially available from Sigma-Aldrich |
| Tetraalkoxy Silane II (TPOS) | Tetra(n-propoxy)silane | Commercially available from Sigma-Aldrich |
| UV Light Photoinitiator | 2-hydroxy-2-methylpropiophenone | Commercially available from Gelest |
| Condensation Catalyst | di-isopropoxytitanium bis(ethylacetoacetate) | Commercially available from Gelest. |
| Alkenyl-functional alkoxy-free organopolysiloxane I - additive | Vinyl-functional dimethylpolysiloxane having the chemical structure: $(CH_3)_2ViSiO—[(CH_3)_2SiO]_{290}—Si(CH_3)_2Vi$ | Commercially available under the name XIAMETER™ RBL-9117 from The Dow Chemical Company |
| Alkenyl-functional alkoxy-free organopolysiloxane II - additive | Vinyl-functional dimethylpolysiloxane having the chemical structure: $(CH_3)_2ViSiO—[(CH_3)_2SiO]_{766}—Si(CH_3)_2Vi$ | Commercially available under the name XIAMETER™ RBL-9128 from The Dow Chemical Company |
| Alkenyl-functional alkoxy-free organopolysiloxane III - additive | Vinyl-functional dimethylpolysiloxane having the chemical structure: $Si[O—(Si(CH_3)_2O)_{30}—Si(CH_3)_2—CH=CH_2]_4$ | Prepare according to procedures taught in U.S. Pat. No. 6,806,339. |
| Alkyl trialkoxy silane - additive | Methyl trimethoxysilane | Commercially available from Sigma-Aldrich |
| Radical acid scavenger - additive | Butylated hydroxytoluene | Commercially available from Sigma-Aldrich |
| Treated Fumed Silica - additive | Hexamethyldisilazane treated fumed silica | Commercially available from Cabot under the name Cabot TS-530. |
| Alternative Adhesion Promoter (AP) I | 1,6-bis(trimethoxysilyl)hexane | Commercially available from Gelest |
| Alternative Adhesion Promoter (AP) II | Vinyltrimethoxysilane | Commercially available from Gelest |
| Intermediate I | $H(CH_3)_2SiOSi(CH_3)_2C_2H_4Si(OCH_3)_3$ | Synthesize according to U.S. Pat. No. 4,871,827. |

Second Organopolysiloxane—Preparation of Trimethoxysilyl and Vinyl-Functional Dimethoxypolysiloxane Into a 2-liter Atlas batch reactor add 638.1 grams (g) of Alkenyl-functional alkoxy-free organopolysiloxane III and 40.5 g of Intermediate I. Agitate the resulting mixture for 10 minutes at 350 revolutions per minute (RPM) and then add 10 weight parts per million weight parts mixture of Karstedt's catalyst (commercially available under the name SYL-OFF™ 4000 Catalyst from The Dow Chemical Company, SYL-OFF is a trademark of The Dow Chemical Company). Agitate the mixture at 23-25° C. for 3 hours. Infrared spectrum of the resulting product reveals complete loss of SiH peak at 2110 Cm-1, indicating completion of the hydrosilylation reaction. A portion of the vinyl groups on the siloxane converted to moisture curable trimethoxysilyl containing functionality.

The resulting copolymer is 0.6 wt % vinyl and 0.8 wt % trimethoxysilyl and has the following average chemical structure:

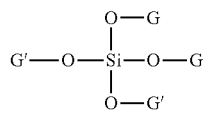

where:

G has the following structure:

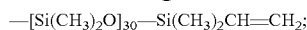

and

G' has the following structure:

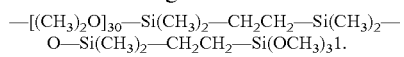

Comparative Example (Comp Ex) 1—Dual Cure Composition with No Adhesion Promoter

Into a 100 milliliter (mL) dental cup combine 6.38 g of the First Organopolysiloxane, 16.3 g of alkenyl-functional alkoxy-free organopolysiloxane I, 10.9 g of alkenyl-functional alkoxy-free organopolysiloxane II, and 12.4 g of Treated Fumed Silica-Additive. Mix the components using a dental mixer at 1000 RPM for 20 seconds and 2000 RPM for 45 seconds. Then, add 24 g of the Second Organopolysiloxane and mix using a dental mixer at 2000 RPM for 45 seconds. Add to the resulting mixture a premixed combination of 2.81 g methyl trimethoxysilane, and 0.42 g of butylated hydroxytoluene. Mix using a dental mixer for 30 seconds at 2000 RPM. Add 0.74 g UV Light Photoinitiator and 0.08 g Condensation Catalyst. Mix using a dental mixer for 30 seconds at 2000 RPM. Package the resulting composition in three 30 mL syringes and deair (all bubbles to rise and expel), then vacuum seal in an aluminum bag until used.

Comp Ex 2—Dual Cure Composition with Alternative API (0.5 wt %)

Prepare Comp Ex 2 in like manner as Comp Ex 1 except include 0.35 g of Alternative AP I in the premixed combination.

Comp Ex 3—Dual Cure Composition with Alternative API (1.0 wt %)

Prepare Comp Ex 3 in like manner as Comp Ex 1 except include 0.70 g of Alternative AP I in the premixed combination.

Comp Ex 4—Dual Cure Composition with Alternative AP II (0.5 wt %)

Prepare Comp Ex 4 in like manner as Comp Ex 1 except include 0.35 g of Alternative AP II in the premixed combination.

Example (Ex) 1—Dual Cure Composition with TEOS (0.5 wt %)

Prepare Ex 1 in like manner as Comp Ex 1 except include 0.35 g of TEOS in the premixed combination.

Example 2—Dual Cure Composition with TEOS (1.0 wt %)

Prepare Ex 2 in like manner as Comp Ex 1 except include 0.70 g of TEOS in the premixed combination.

Example 3—Dual Cure Composition with TPOS (0.5 wt %)

Prepare Ex 3 in like manner as Comp Ex 1 except include 0.35 g of TPOS in the premixed combination.

Comp Ex 5—UV Curable Composition with TEOS (0.5 wt %)

Into a 100 mL dental cup add 11.48 of First Organopolysiloxane, 16.3 g of alkenyl-functional alkoxy-free organopolysiloxane I, 10.9 g of alkenyl-functional alkoxy-free organopolysiloxane II, 24 g of Alkenyl-functional alkoxy-free organopolysiloxane III and 12.4 g of Treated Fumed Silica. Ix for 20 seconds at 1000 RPM and 45 seconds at 2000 RPM using a dental mixer. Add to this mixture a premix of 2.81 g methyl trimethoxysilane, 0.42 g butylated hydroxytoluene, and 0.35 g TEOS. Mix for 30 seconds at 2000 RPM using a dental mixer. Add 0.74 g of UV Light Photoinitiator and 0.08 g Condensation Catalyst. Mix for 30 seconds at 2000 RPM using a dental mixer. Package the resulting composition in three 30 mL syringes and deair (all bubbles to rise and expel), then vacuum seal in an aluminum bag until used.

Comp Ex 6—UV Curable Composition Alternative AP II (0.5 pts)

Prepare Comp Ex 6 in like manner as Comp Ex 5 except replace the 0.35 g TEOS with 0.5 g Alternative APII.

Substrate Adhesion Testing

Prepare samples for Substrate Adhesion Testing by drawing down 0.38 millimeters (15 mils) coating of each formulation onto an aluminum metal substrate and a FR4 Board substrate. Cure the coating by ultraviolet radiation using a Colight UV-6 device with a mercury lamp having an intensity of 300 milliWatts per square centimeter and a 2 Joules per square centimeter exposure. Allow the samples to set for 3 days at 23-25° C. and 50% relative humidity to produce test films on the two different substrates.

Evaluate the substrate adhesion strength for each of the samples using a BYK 5120 Testing Kit with 6 blade-sets spaced one millimeter apart to cut a lattice pattern into cured coating samples by drawing the 6-blade set across the coating in perpendicular directions to create a lattice pattern. Then brush the test area 5 times in different directions with the brush in the kit to remove all the loose film from the surface. Firmly apply tape from the kit over the cross-cut area and remove quickly by pulling the tape back off from the test area to eliminate coating residues on the surface. Image the test area using a KEYENCE VHX digital microscope and score the results according to the following ranking: 5A=No pealing or removal; 4A=Trace peeling or removal along incisions or at their intersection; 3A=Jagged removal along incisions up to 1.6 millimeters (1/16 inch) on either side; 2A=Jagged removal along most of incisions up to 3.2 millimeters (1/8 inch) on either side; 1A=Removal from most of the coating in the lattice pattern under the tape; and 0A=Removal beyond the area of the X.

Table 2 presents Substrate Adhesion Testing results for the Exs and Comp Exs.

TABLE 2

| Sample | FR4 Board Adhesion Rating | Aluminum Adhesion Rating |
|---|---|---|
| Ex 1 | 5A | 5A |
| Ex 2 | 5A | 4A |
| Ex 3 | 5A | 5A |
| Comp Ex 1 | 1A | 1A |
| Comp Ex 2 | 4A | 1A |
| Comp Ex 3 | 2-3A | 1A |
| Comp Ex 4 | 1A | 1A |
| Comp Ex 5 | 2-3A | 1A |
| Comp Ex 6 | 1A | 1A |

The results in Table 2 show that the tetraalkoxysilane adhesion promoters demonstrate 5A or 4A adhesion to both substrates and superior adhesion relative to the alternative adhesions promoters. Additionally, the results in Table 2 illustrate better adhesion with the dual cure compositions comprising tetraalkoxy silanes than just the UV curable compositions with tetraalkoxy silane or alternative adhesion promoter.

Shelf Life Stability Testing

Measure the viscosity of the Exs 1 and 2 and Comp Exs 2 and 3 immediately after preparing and again after allowing to set for 14 days at 55° C. in the syringe, sealed in an aluminum bag. Measure the viscosity of the samples by according to ASTM D 1084 using a Brookfield DVI cone and plate viscometer with the cone spindle CPA-52Z spinning at one revolution per minute and at a temperature of 23+/−2° C. Viscosity results are in Table 3.

TABLE 3

|  | Ex 1 | Ex 2 | Comp Ex 2 | Comp Ex 3 |
|---|---|---|---|---|
| Viscosity of Fresh Sample (milliPascal*seconds) | 34,930 | 33,340 | 35,860 | 35,200 |
| Viscosity of Aged Sample (milliPascal*seconds) | 268,300 | 182,600 | Cured to solid | Cured to solid |

The results in Table 3 illustrate that the tetraalkoxy silane adhesion promoters have better shelf stability than 1,6-bis(trimethoxysilyl)hexane adhesion promoter.

What is claimed is:

1. A composition comprising:
   (a) a first organopolysiloxane comprising an average of 2 or more mercaptoalkyl groups per molecule and that is free of alkenyl functionality;
   (b) a second organopolysiloxane comprising an average of one or more alkenyl group and one or more alkoxy group per molecule;
   (c) a tetraalkoxy silane;
   (d) an ultraviolet light photoinitiator; and
   (e) a condensation catalyst;
   where the concentration of the first and second organopolysiloxanes are such that the molar ratio of mercaptoalkyl groups to alkenyl groups is in a range of 0.4 to 3.0.

2. The composition of claim 1, the first organopolysiloxane has the following structure:

$(R_2R''SiO_{1/2})_2(RR'SiO_{2/2})_m(R_2SiO_{2/2})_n$ 

where:
   each R is independently in each occurrence selected from a group consisting of alkyl and aryl groups;
   each R' is independently in each occurrence selected from a group consisting of mercaptoalkyl groups;
   R'' is independently in each occurrence selected from the options for R and R';
   subscript m is the average number of $(RR'SiO_{2/2})$ groups per molecule and is 2 or more and at the same time is 100 or less; and
   subscript n is the average number of $(R_2SiO_{2/2})$ groups per molecule and is zero or more while at the same time is 1000 or less.

3. The composition of claim 1, wherein the second organopolysiloxane has the following structure:

$(SiO_{4/2})_x(R^a{}_2SiO_{2/2})_y(R^aB\,SiO_{2/2})_{y'}(R^a{}_2BSiO_{1/2})_z$ 

where:
   $R^a$ is independently in each occurrence selected form alkyl and aryl groups;
   B is independently in each occurrence selected from alkenyl and alkoxy and alkoxy-containing groups so as to achieve an average of one or more alkenyl group and one or more alkoxy group per molecule;
   x is, on average, a value of zero or more and at the same time 10 or less;
   the sum of y and y', on average, is a value of 20 or more while at the same time is 1000 or less; and
   z has, on average, a value of 2 or more and at the same time is 20 or less.

4. The composition of claim 1, wherein the second organopolysiloxane has the following structure:

$(SiO_{4/2})(R^a{}_2SiO_{2/2})_y(R^a{}_2BSiO_{1/2})_4$ 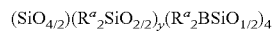

where y has an average value of 20 or more while at the same time 1000 or less; $R^a$ is independently in each occurrence selected form alkyl and aryl groups; one or more than one B is a vinyl group and one or more than one B is —$CH_2CH_2$—$Si(CH_3)_2$—O—$Si(CH_3)_2$—$CH_2CH_2$—$Si(OCH_3)_3$.

5. The composition of claim 1, wherein the tetraalkoxy silane has the following molecular structure: $Si(OR^\gamma)_4$, where $R^\gamma$ is independently in each occurrence a monovalent hydrocarbon having one or more and at the same time 10 or fewer carbon atoms.

6. The composition of claim 1, where the concentration of tetraalkoxy silane is 0.1 to 5.0 weight-percent relative to composition weight.

7. The composition of claim 1, wherein the concentration of ultraviolet light photoinitiator is 0.01 to 5 weight-percent and the concentration of condensation catalyst is 0.01 to 10 weight-percent, with weight-percent relative to composition weight.

8. The composition of claim 1, wherein the composition further comprises any one or any combination or more than one of the following additional components: (i) an alkenyl-functional alkoxy-free organopolysiloxane; (ii) an alkyl trialkoxy silane; (iii) a radical scavenger; and (iv) fillers.

9. A method of using the composition of claim 1, the method comprising applying the composition to a substrate and optionally exposing the composition to ultraviolet light.

10. An article comprising the composition of claim 1 in contact with a substrate.

\* \* \* \* \*